United States Patent [19]

Izuhara

[11] 4,455,068

[45] Jun. 19, 1984

[54] CAMERA CAPABLE OF PROGRAMMED EXPOSURE CONTROL

[75] Inventor: Koichi Izuhara, Osaka, Japan

[73] Assignee: Minolta Camera Kabushiki Kaisha, Osaka, Japan

[21] Appl. No.: 329,748

[22] Filed: Dec. 11, 1981

[30] Foreign Application Priority Data

Dec. 11, 1980 [JP]  Japan ............................... 55-175393

[51] Int. Cl.³ ............................................. G03B 7/097
[52] U.S. Cl. ............................... 354/412; 354/289.12; 364/525
[58] Field of Search ..................... 354/23 D, 50, 60 R, 354/75, 76, 289; 352/141; 364/525

[56]  References Cited

U.S. PATENT DOCUMENTS

| 4,103,307 | 7/1978 | Shinoda et al. | 354/23 |
| 4,286,849 | 9/1981 | Uchidoi et al. | 354/23 |
| 4,320,944 | 3/1982 | Nakai | 354/23 D |
| 4,329,029 | 5/1982 | Haskell | 364/525 |

Primary Examiner—Russell E. Adams
Attorney, Agent, or Firm—Jackson, Jones & Price

[57] ABSTRACT

The present invention provides an optimum programmable camera that can be subjectively programmed to accomodate a user's personal demand. The user can enter in various combinations of F-values and exposure times for implementation under different lighting conditions. A graphic display can be provided on the back of the camera to facilitate the subjective programming and storage of program lines. Thus, the user is capable of completely and subjectively determining the operation of the camera to meet his own individual demands.

18 Claims, 14 Drawing Figures

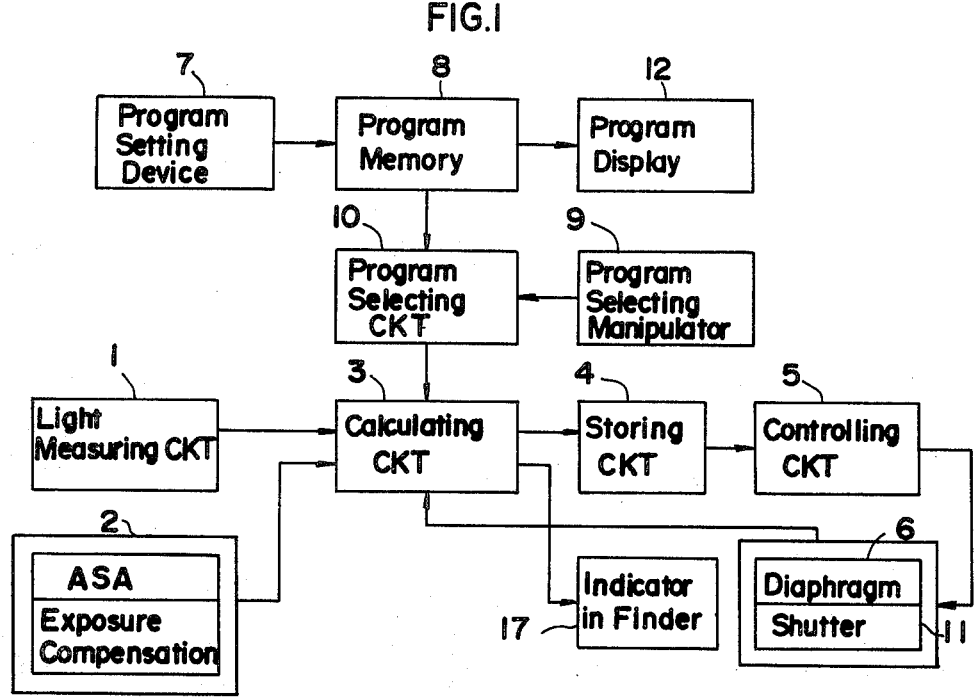
FIG.1
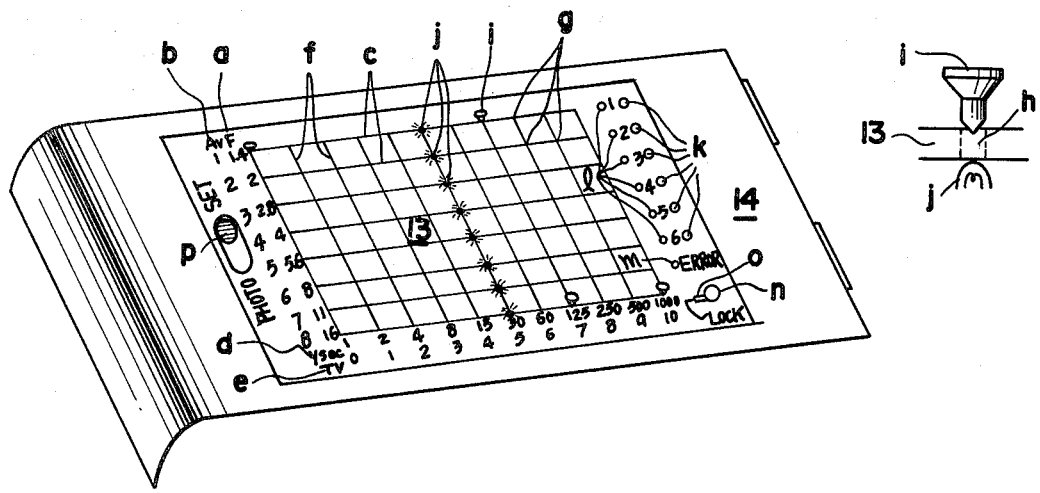
FIG.2
FIG.3

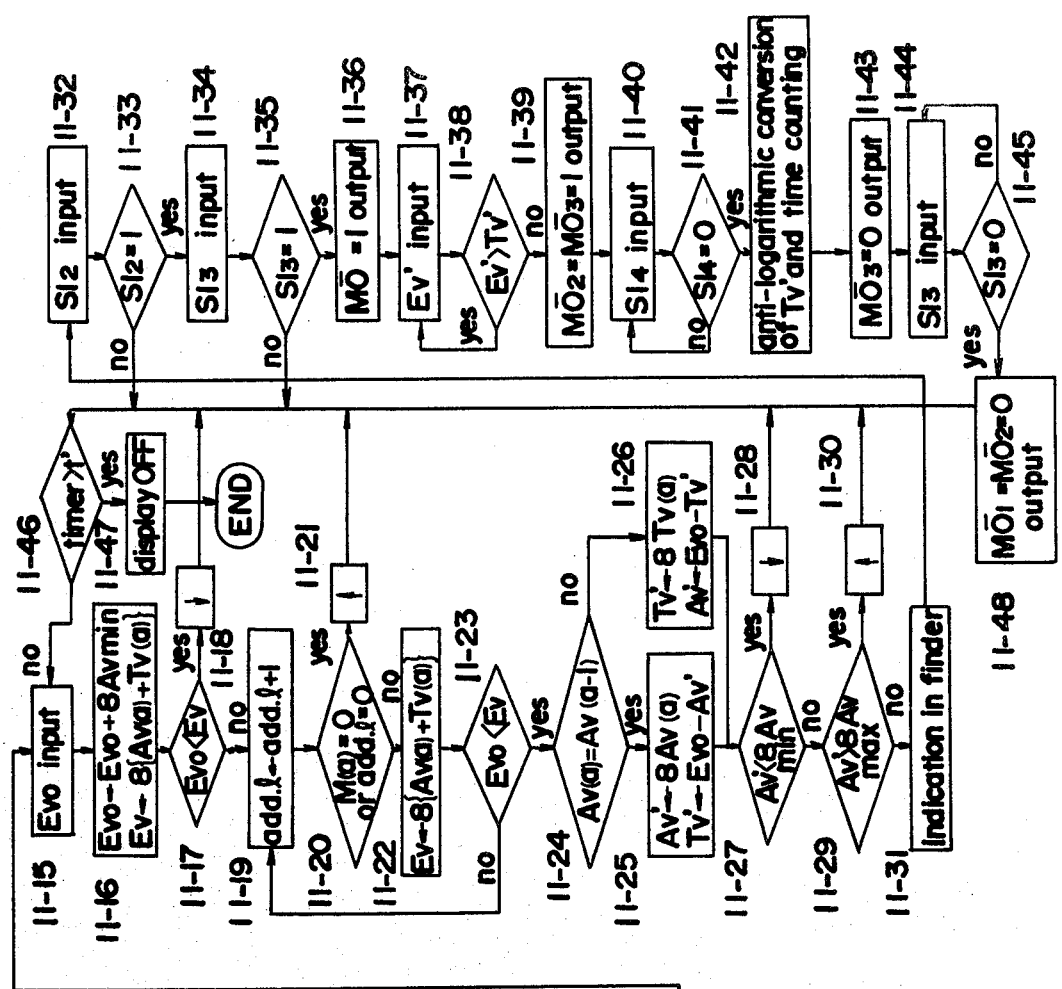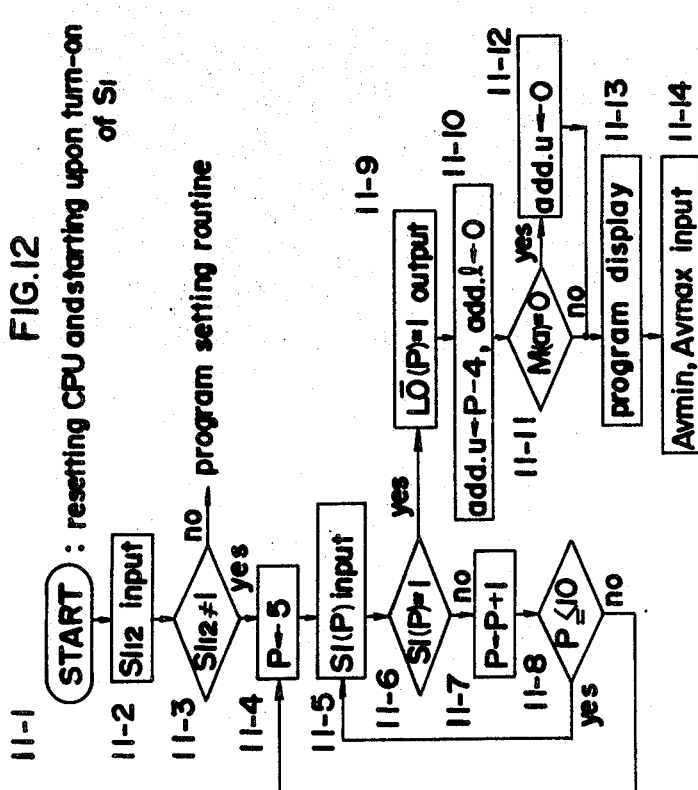
FIG.12

CAMERA CAPABLE OF PROGRAMMED EXPOSURE CONTROL

BACKGROUND OF THE INVENTION

1. Field of the Invention

This invention relates to a camera with programmed exposure control and more particularly to a camera wherein exposure is controlled according to subjectively determined and stored corresponding combinations of aperture values and exposure times for each of various exposure values.

2. Description of the Prior Art

It is well known that two kinds of exposure control are used; one wherein a combination of an aperture value and an exposure time is selected for a particular exposure value each time photographing is effected and the other wherein all of the combination of aperture value and exposure times are predetermined for individual exposure values in order to assure easiness of operation. A socalled manual exposure control is a typical example of the former, and an automatic exposure camera wherein a preferred one of exposure time or aperture value is changed every photographing also falls within the concept of the former. On the other hand, an example of the latter type is an aperture-preferred or exposure time-preferred automatic exposure camera in a normal of operation wherein a preferred one of the exposure information is fixed at a particular value in advance of photographing. In other words, this mode can be regarded as an exposure control wherein all combinations of the aperture values and exposure times are predetermined for individual exposure values, because one of the aperture value and exposure time is known in advance from a one-to-one relationship with any exposure value when the other is fixed at a particular value. A programmed automatic exposure control method to vary both the aperture value and exposure time in a given relationship with variations in the exposure value also belongs to the latter type of exposure control systems.

When the term "program line" is used (throughout the present disclosure) it should be understood to represent a possible variation in both the aperture value and exposure time, in combination, in response to a variation in the exposure value, the program line can vary depending upon the exposure control method of various cameras. A discussion on the comparative merits of an exposure time-preferred camera and an aperture-preferred camera can be focused mainly on the morphology of the program lines. In connection with the morphology of the program lines, so-called programmed exposure controls in a narrow sense have been suggested which rely upon a program line describing both the aperture value and exposure time varying at a fixed rate in response to variation in the exposure value or a program line describing only the aperture value varying before a particular exposure value is reached and only the exposure time varying thereafter. Varied forms of program lines on the one hand have been suggested and cameras on the other hand have also been suggested wherein a plurality of different forms of program lines are pre-prepared and optically optionally selectable to accommodate a wide range of versatile intended uses such as U.S. Pat. Nos. 4,103,307 and 4,286,849. However, the opportunity to match a user with program line suited for all of his preferences and all of his intended uses is still very low. Further, in a camera having a plurality of selectable program lines, it is quite likely that a number of program lines will be of slight or no use and would lead to an objectionable increase in the total cost of the camera and the complexity of operation.

Finally, Japanese Laid Open Patent Application No. 54-138431, which corresponds to allowed U.S. Pat. application Ser. No. 29,919, discloses a pre-stored program that can be modified. The prior art is still seeking an optimum programmable camera that can subjectively accommodate a user3 s personal demands.

SUMMARY OF THE INVENTION

Accordingly, it is an object of the present invention to provide a camera which overcomes the above discussed problems and has a capacity of storing only those program line oriented for the particular user3 s preference and their intended use.

To achieve the above object, the present invention provides a camera which has a feasibility of creating a uniqueness of exposure control conforming to any individual user's preference by the provision of a setting device for introduction of any desired program line, a memory device for storing the program line so introduced and an exposure control device that can be governed under control of the program line stored in the memory device. Furthermore, the camera embodying the present invention is capable of exhibiting a totally different exposure control by means of entirely revising the program line when being used by a different person or for a different use, as well as improving the program line step by step depending upon the user's own experience.

In addition, according to the present invention, two or more program lines which are selectable may be stored within a memory device of an increased capacity. In this case, any one of the original program lines stored may be selected according to the existing situation. Further, any existing program line of a decreasing frequency of use may be substitued by a new program line of an expected greater frequency of use whenever desired.

Assuming that the first program line is stored as an exposure time-preferred program line with a preferred exposure time of 1/60 sec. and the second as an aperture-preferred program line with a F 5.6, mode selection may be achieved through a single operation of selection of the program lines. In contrast, thereto, for the prior art camera where the exposure time-preferred mode and the aperture-preferred mode are alternatively selectable, it is in principle necessary to carry out at least two opeations, i.e., (1) selection of mode and (2) selection setting of the exposure time at 1/60 sec. or the stop at F 5.6.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a block diagram of an embodiment of the present invention;

FIG. 2 is a perspective view showing details of an example of a program setter;

FIG. 3 is a partial cross sectional view of the setter;

FIG. 12 is a flow chart for explaining a photographing routine in the embodiment of FIG. 7.

DETAILED DESCRIPTION OF THE PREFERRED EMBODIMENTS

Figure 4:
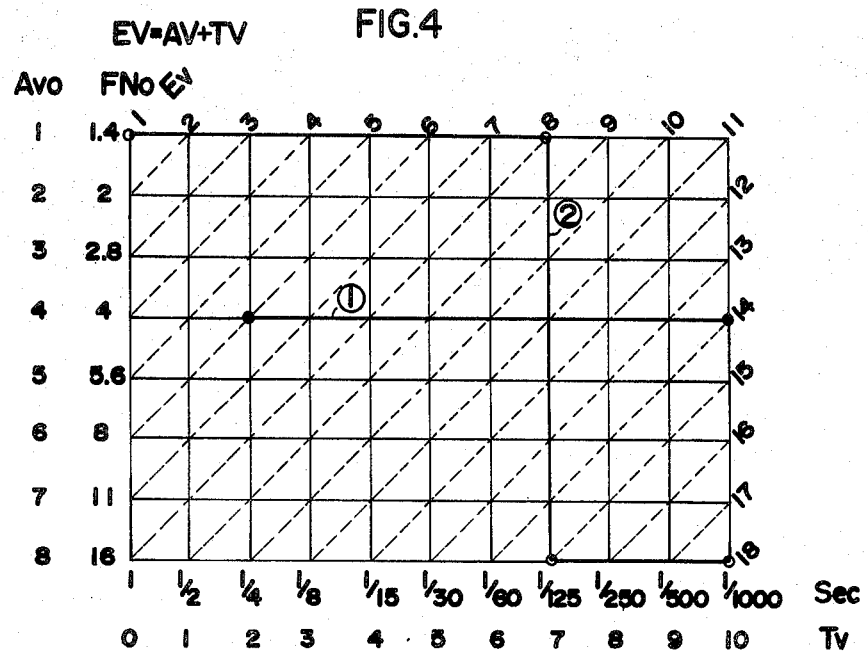
FIGS. 4 and 5 are graphs showing typical program lines to be set.

The following description is provided to enable any person skilled in the camera art to make and use the present invention and sets forth the best modes contemplated by the inventors of carrying out their invention. Varied modifications, however, will remain readily apparent to those skilled in the art, since the generic principles of the present invention have been defined herein specificaly to provide a compact camera capable of programmed exposure control.

FIG. 1 is a block diagram illustrating an embodiment of the present invention. A photometry circuit (1) is designed to deliver an output corresponding to the brightness Bv of an object minus Avmin (Bv-Avmin) wherein Avmin is the APEX value of the fully open stop aperture value. A diaphragm (6) develops the signals corresponding to Avmin and Avmax, respectively, wherein Avmax represents the APEX value of the smallest aperture size. A setting device (2) is provided which establishes a particular film sensitivity Sv and an exposure correction value $\Delta$Ev. A program line setting device (7) is provided which can set several personal program lines usually used by the user. A program line memory (8) is also provided which stores the program lines preset by the setting device (7). A program line display (12) displays the program lines thus stored. A program line selector (10) having a program lines selecting member (9) is provided which selects and fetches a particular one of the program lines from the memory (8) and feeds that particular program line to an arithmetic unit upon actuation of the selecting member (9). The arithmetic unit (3) calculates the total Ev by adding the photometric readout Bv-Avmin, the fully open aperture value Avmin and the sum of the film sensitivity and the exposure correction value, i.e., Sv+$\Delta$Ev and then delivers corresponding Av and Tv values for individual Ev values on the program lines. The Av and Tv values are apex values characteristic of the stops and exposure times. A finder display circuit (17) is designed to provide visual displays of various exposure signals. The memory circuit (4) stores these Av and Tv values.

In the drawings, the shutter is denoted by (11) and the diaphragm is denoted by (6). A control circuit (5) controls the diaphragm and the shutter in response to the Av and Tv values stored. The shutter release is locked or a warning of excessively high or low brightness is given in the event that the results Ev of the calculations fall out of a permissible range afforded by the program line or the Av values fall into a range impossible for the actual diaphragm device to realize.

FIG. 2 shows a program setting board (13) mounted on a rear lid (14) which corresponds to the program line setter (7) of FIG. 1. In FIG. 2, the F numbers or values are denoted by (a), the Av values by (b), equivalent Av curves by (c), the reverses of the exposure times by (d), the Tv values by (e), equivalent Tv curves by (f), the crossings of (c) and (f) by (g) and program pins by (i). Program line indication lamps (j) are disposed under (g) and fired for every integer Ev on the program lines stored. There is further provided program select buttons (k) and program select indication lamps (1). In the illustrated embodiment, the program lines are selectable up to six. An error indication lamp (m) is enabled when programs are not properly loaded (that is, when no more than one program pin is inserted or when the user fails to insert the second program pin in correspondence with a small Ev value). There is further provided a memory button (n) and a memory lock switch (o), which when the latter is in a "LOCK" position locks the positions of the memory button (n) for preventing erroneous settings. A changeover switch (p) is placed into a "SET" position or "PHOTOGRAPH" position when setting a program line is desired or when photographing is desired, respectively.

FIG. 3 is a cross sectional view of the crossing (g) of (f) and (c) wherein a path between a particular equivalent Tv curve (f) and a particular equivalent Av curve (c) is in a conducting relationship through the crossing (g) when the program pin (i) is inserted into an opening (h). The program pins (i) are transparent through which the lamps (j) are viewable from above.

Although the disclosed program line setting board is designed to cover the Av values of 1 through 8 and the Tv values of 0 through 10, it is obvious that the Av and Tv values may also be selected above these defined ranges. Further, comparison tables of the Av and Ev values, of Tv and Ev, etc., may replace the above suggested comparison table of the Av and Tv values.

Figure 5:
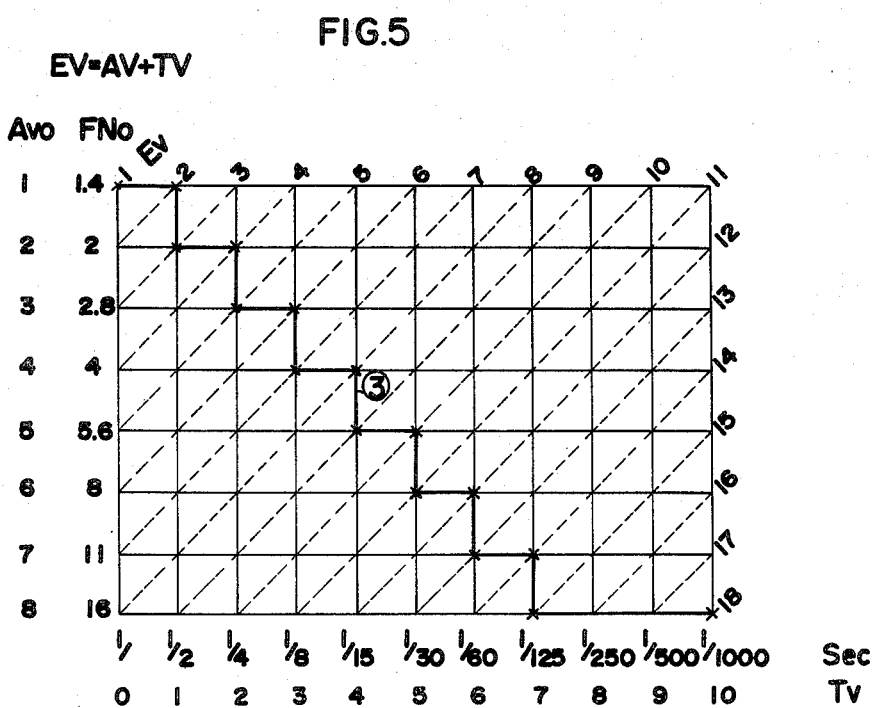

FIGS. 4 and 5 depict typical examples of the program lines drawn. The program line ① indicates a stop-preferred AE with an F-number of 4, as selected by the program pins inserted at the maximum and minimum points (denoted by ·) of the exposure time. The line ② describing a super-automatic T mode (exposure time-preferred AE whereby the exposure time is varied for the Av values falling out of a permissible range) is selected when the program pins are inserted at the crossings of the Av and Tv values assuring the maximum and minimum Ev values and the shoulder (as denoted by °) of the program line, respectively. The line ③ in FIG. 5 shows an example of a programed AE wherein the program pins are positioned in points as marked by X.

If the user inserts only one of the program pins or has forgotten to insert a second program pin at a position corresponding to a lower Ev value, e.g., (Av, Tv)=(1, 7) in the line ② in FIG. 4 or (Av, Tv)=(1, 1) as in the line ③ in FIG. 5 during the drawup of the program lines, then an error indication is provided. In summary, in the case where the program line is not defined primarily by the program pins, the error lamp is fired. Any and all desired program lines can be drawn up through the use of the program line setting board.

Figure 6A:
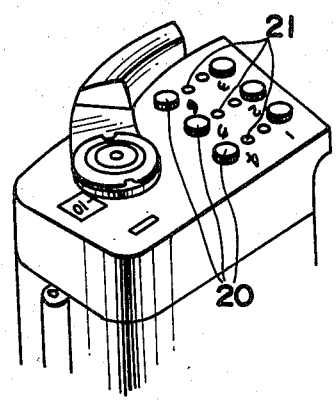
FIGS. 6(a) and 6(b) are perspective views of two modifications in part of the embodiment of FIG. 2.
Figure 6B:
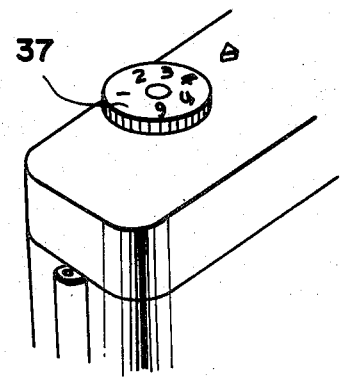

FIGS. 6(a) and 6(b) illustrate two modifications in the above illustrated embodiment, wherein the program select buttons and the program select indication lamps are disposed somewhere out of the program line setting board. In FIG. 6(a), the program select buttons are denoted by (20) and the program select indication lamps are denoted by (21). As is clear from FIG. 6(b), the program selector may be constituted by a program dial (37).

What follows is a description of how to use the above illustrated embodiment. When the first program line is preset as indicated by ② in FIG. 4, the changeover switch (p) of FIG. 2 is placed into the "SET" position. Then, either the button "1" of the program select buttons (k) of FIG. 2 or the button "1" of the program select buttons (20) of FIG. 6(a) is depressed or the program dial (37) of FIG. 6(b) is rotated with "1" into alignment with an index finger. In FIG. 2, the program pins (i) are inserted to stand at the crossing of "1" on the equivalent Av curves (c) and "0" on the equivalent Tv curves (f), the crossing of "1" on the equivalent Av curves (c) and "7" on the equivalent Tv curves (f), the crossing of "8" on the equivalent Av curves (c) and "7" on the equivalent "7" Tv curves (f) and the crossing of "8" on the equivalent Av curves (c) and "10" on the equivalent Tv curves (f), respectively. The memory lock switch (o) is released and the memory button (n) is depressed. The program line is drawn in such a manner as to tie the standing program pins along the equivalent Av curves or the equivalent Tv curves.

Through the above described procedure the program line as indicated by ② in FIG. 4 is completed and stored. While "2", "3" and so forth are sequentially selected in a likewise manner by the program select buttons or the program select dial, the program pins are aligned at desired crossings or positions and the memory button (n) is then depressed each time the drawing up of a program line is completed. Upon the completion of the drawing up of all of the desired program lines the memory lock switch is forced into "LOCK" position and the changeover switch is placed into "PHOTOGRAPH" position.

Under these circumstances, all that is necessary to select a desired one of the program lines stored is to depress a desired one of the memory buttons (k) or (20) or to rotate the memory select dial (37) to a desired value. The stop or F-value and the exposure time are governed under the selected one of the program lines and the photometric readouts, prior to photographing.

When it is desired to alter any of the program lines, the changeover switch (p) is placed into "SET" position and the memory lock switch (o) is released to initiate the setting and loading procedure described above.

Figure 7:
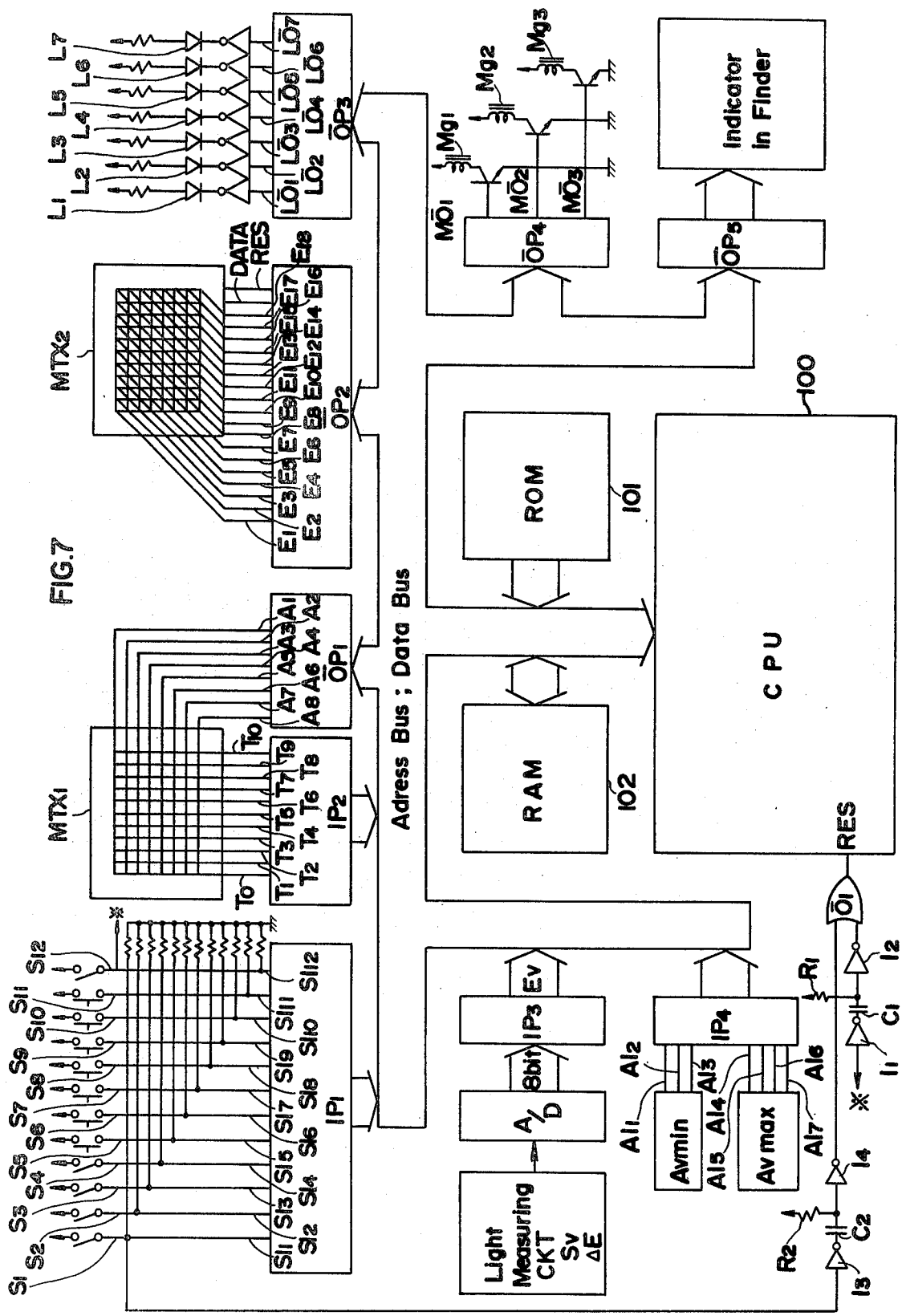
FIG. 7 is a detailed circuit diagram of another embodiment of the present invention, which includes a program line setting board and a microcomputer.

FIG. 7 is a circuit diagram illustrating another embodiment of the present invention, which comprises primarily the program line setting board and a microcomputer (CPU). In this embodiment, there is provided a CPU (100), a read only memory ROM (101) for storing instructions and data and a writable and readable memory RAM (random access memory) (102) wherein data are re-writable. Input ports (IP1)–(IP4) and latch output ports ($\overline{OP1}$)–($\overline{OP5}$) are connected to an address bus and data bus of the CPU together with the ROM and RAM and assigned its unique addresses. A photometry circuit delivers an analog Ev value characteristic of the brightness readouts Bv of objects (Bv—Avmin in open photometry in a single-lens reflex camera) plus the film sensitivity Sv and the exposure correction value ΔE. A corresponding digital Ev value of 8 bits long resulting from an analog-to-digital conversion of the analog Ev value is introduced via (IP3). The upper 5 bits of the 8 bits Ev value represent an integer portion of data and the lower 3 bits represent a fraction portion of the data, with the minimum resolution of $\frac{1}{8}$ Ev. (Avmin) and (Avmax) are digital values characteristic of the minimum and maximum Av values and introduced from (IP4) by way of terminals (AI1)–(AI3) and (AI4)–(AI7).

A switch (S1) is placed into a closed position upon a first-step depression of the release button and is also used in resetting the CPU via an OR gate ($\overline{O1}$). A switch (S2) is closed upon a second-step depression of the release button, while a switch (S3) is placed into a closed position upon completion of the windup of a film and into open position upon completion of travel of the second exposure of the film. A switch (S4) is opened in synchronism with the beginning of travel of the first exposure. Switches (S5)–(S10) are closed in response to actuation of corresponding ones of the program selector buttons. A switch (S11) is forced into a closed position upon actuation of the memory button. A switch (S12) is placed into a closed position when the changeover switch is turned to a "SET" position. These switches (S1)–(S12) are coupled as inputs with (IP1) via terminals (SI(1))–(SI(12)). With (S12) in a closed position, a pulse is developed from inverters (I1, I2), a resistor (R1) and a capacitor (C1) to reset CPU by way of the OR gate ($\overline{O1}$). Inverters (I3, I4), a resistor (R2) and a capacitor (C2) connected to (S1) serve in the same manner as described above. A two-dimensional matrix sensor (MTX1) of a 8×11 matrix is provided which senses points on the program line on the program line setting board and an A line and a T line are maintained in conducting relationship through a particular program point when the program pin is placed at that particular point. Accordingly, ($\overline{OP1}$) delivers a signal for bringing one of terminals (A(1)) - (A(8)) up to a "High" level. By deciding from (IP2) which of the terminals (T(0)) -(T(0)) is at the "High" level, it becomes possible to find a point on the program lines because only a particular T line traversing that program point is rendered conductive with the A line. As an alternative, a switch may be provided which is locked on every crossing of the A line and the T line to maintain the A line and the T line in a conducting relationship. A family of LEDs (MTX2) is provided on the program line setting board for the purpose of displaying the program lines. Program selector display LEDs (L1)–(L6) are each fired when a corresponding one of the switches (S5)–(S10) is closed. LEDs (L1)–(L6) and error display LED (L7) are fired when ($\overline{LO(1)}$)–($\overline{LO(7)}$) increase to a "High" level in response to the ($\overline{OP3}$) output.

A magnet (Mg1) is provided for the release of an electromagnetic shutter and a magnet (Mg2) is provided for governing the diaphragm. A magnet (Mg3) is provided for stopping the shutter for two exposures of the film. (Mg1)–(Mg3) are energized with current flowing therethrough when the ($\overline{OP4}$) output brings terminals ($\overline{MO1}$)–($\overline{MO3}$) to a "High" level and transistor switches are switched ON. The ($\overline{OP5}$) output permits the finder display circuit to display the various exposure signals.

It is noted that the upper 3 bits (add.u) and lower 5 bits (add.l) of an address counter in a data access region and various registers (p, e, c, m, n, T, Avmin, Avmax, Evo, Ev, Av', Tv' and Ev') in FIGS. 9 through 12 are all constituted by general-purpose registers within the CPU. (add.u) are independent of (add.l) with no carry from (add.l) to (add.u). The (p) register is used for storing program select numbers (p=5–10), the (e) register for storing shift register numbers for displaying the program lines, the (c) register for storing pulse numbers introduced thereto, the (m) register for storing A line numbers (m=1–8) of (MTX1), the (n) register for storing T line number (n=0–10), the (T) register for storing the contents T(0)–T(10) of the T line, the (Avmin) and (Avmax) registers for storing the open and maximum stop valued, the (Evo) and (Ev') registers for storing the Ev readouts, the (Ev) register for storing the Ev values of the program lines stored, and the (Av') and (Tv') registers for storing the evaluated Av and Tv values.

The CPU further includes a built-in timer which starts counting time as soon as CPU is placed into a reset state and routines are commenced.

Figure 8:
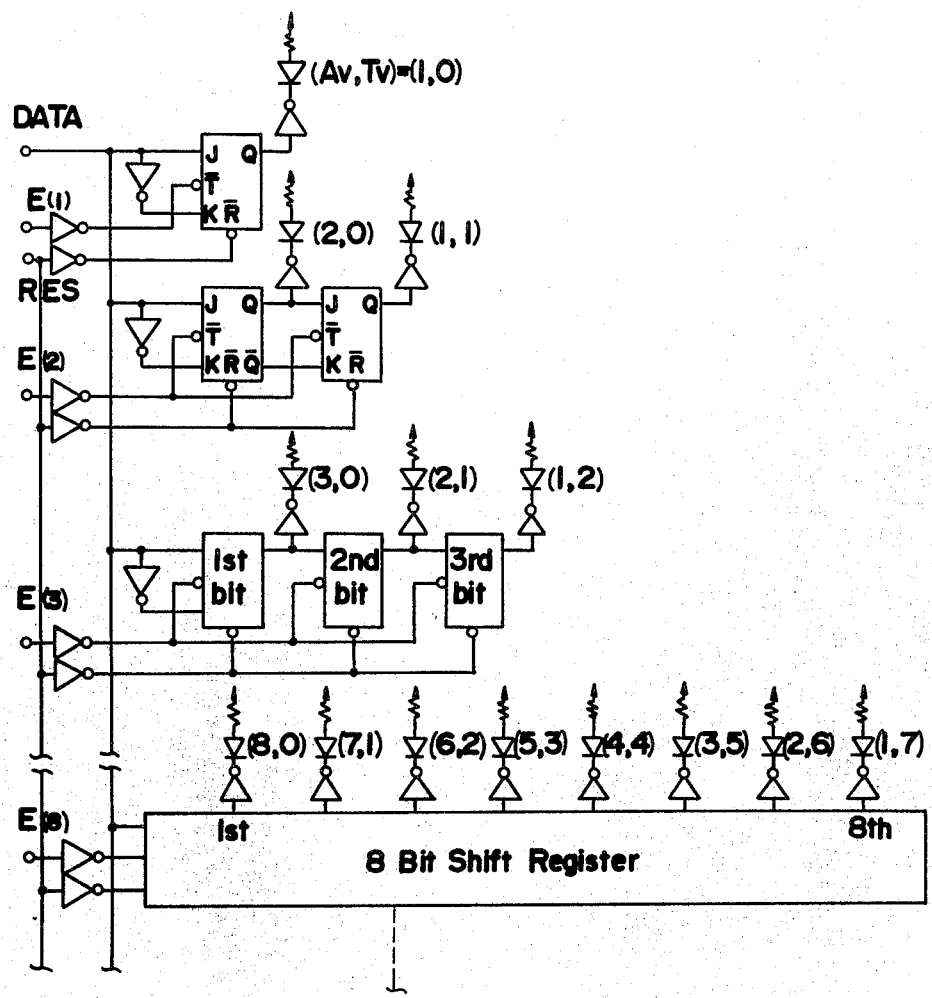
FIG. 8 is a detailed circuit diagram of the principal components in the embodiment of FIG. 7.

FIG. 8 is a diagram illustrating a circuit for enabling (MTX2) to display the program lines. Generally speaking, on the equivalent Ev curve, there are provided two program line displaying LEDs connected to the outputs of shift registers and corresponding LEDs are fired after the outputs of the registers are shifted to the crossing of the program lines and the equivalent Ev curve. In the illustrated example, the shift register is k bits long, 8 bits long and (19-1) bits long when Ev=k≦7, Ev= , 8–11 and Ev=1≧12, respectively.

When a terminal (RES) is held at a "High" level, all the shift registers are reset with its Q outputs of a "Low" level extinguishing all of the program line being displayed. If the terminal (RES) is held at a "Low" level, a terminal (DATA) is at a "High" level and a positive pulse is applied to any one of the terminals (E(1))–(E(18)), then the leading edge of the pulse places the first bit of the shift register bearing a corresponding Ev value into a set state with its Q output of a "High" level firing the LED connected thereto. Should the terminal (DATA) be held at a "Low" level and a positive pulse be applied to a register input terminal (E), the outputs of the shift register are sequentially shifted and corresponding ones of the LEDs are also sequentially fired each time a pulse is applied.

For example, when it is desired to display the program line ③ in FIG. 5, the following procedure is implemented. The terminal (DATA) of the shift register is brought to a "High" level and a positive pulse is supplied to the terminal (E(1)) for Ev=1, so that the first bit is set and the LED of (Av, Tv)=(1, 0) is fired. After the same procedure is followed for Ev=2, the terminal (DATA) is lowered to a "Low" and a single positive pulse is supplied to the terminal (E(2)) so that the shift register is shifted by one bit and the LED of (Av, Tv)=(1, 1) is fired. With Ev=3, the LED of (Av, Tv)=(2, 1) is enabled in the same manner as with Ev=2. With Ev=4, the first bit is set, the terminal (DATA) is held at a "Low" level and the terminal (E(4)) is supplied with two positive pulses, so that the register is shifted two bits and the LED of (Av, Tv)=(2, 2) is enabled. When Ev=5, the LED of (Av, Tv)=(3, 2) is fired through the same procedure as with Ev=4. When Ev=6, the terminal (E(6)) is supplied with three positive pulses after the first bit has been set and the terminal (DATA) has been lowered to a "Low" level, so that the register is shifted by three bits and the LED of (Av, Tv)=(3, 3) is fired. The same procedure is repeated to fire each of the respective LEDs until Ev=18.

Operation of the circuit of FIG. 7 as discussed below can be divided into the program line setting operation and the normal camera operation.

Figure 9:
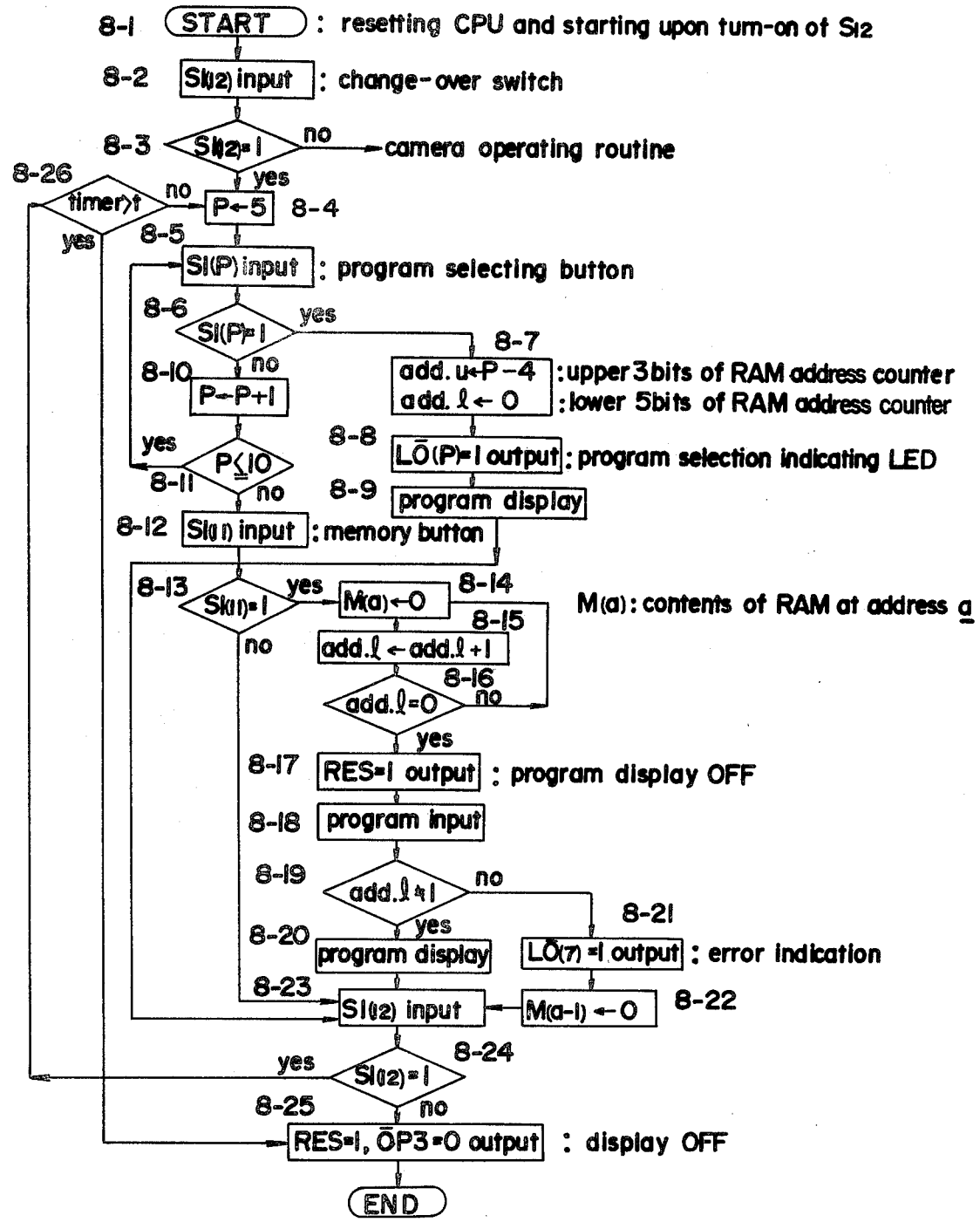
FIG. 9 is a flow chart for explaining a program line setting routine in the embodiment of FIG. 7.
Figure 10:
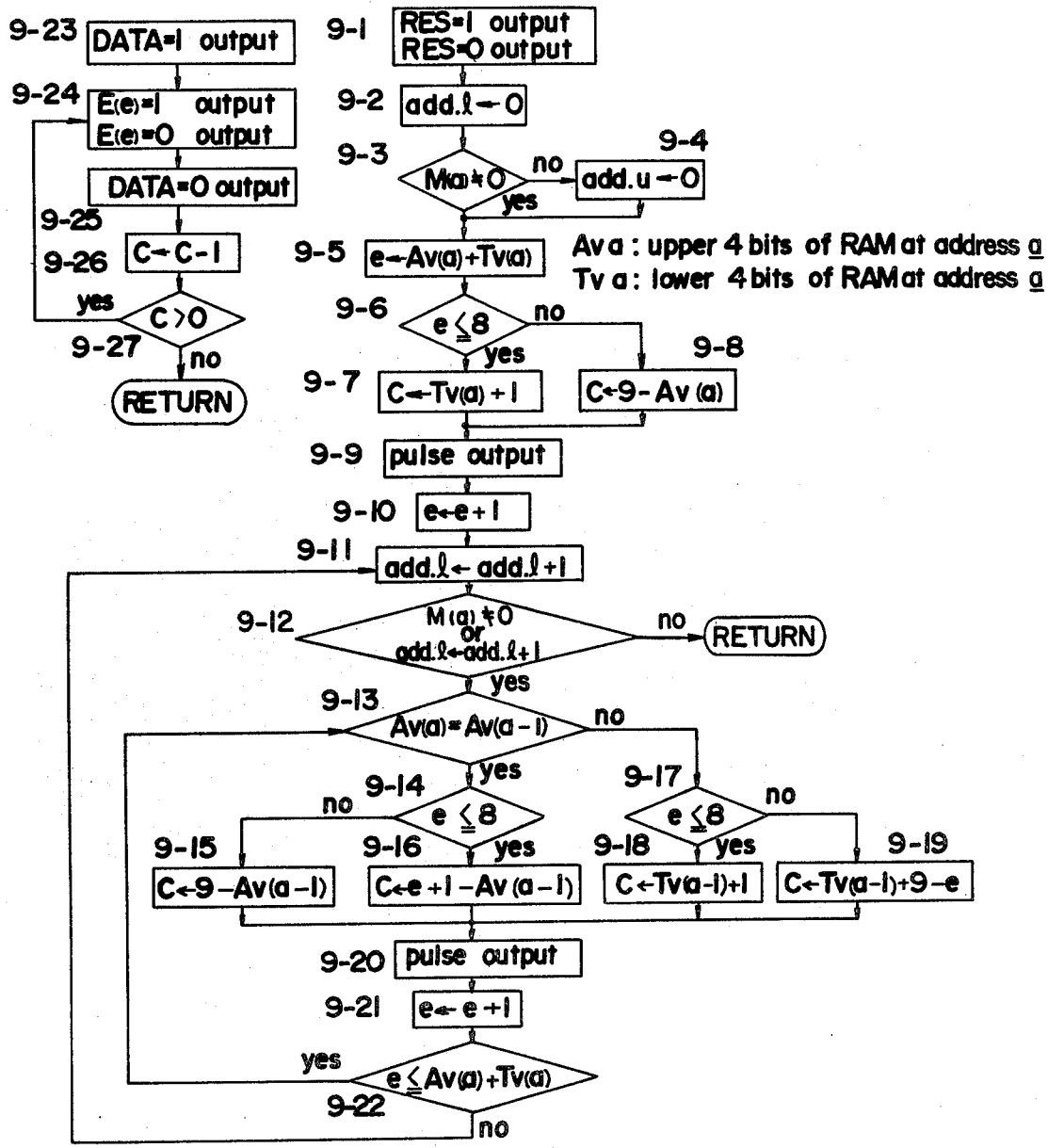
FIG. 10(a) is a flow chart for explaining details of a program line displaying routine.
FIG. 10(b) is a flow chart for explaining details of a pulse output routine in FIG. 10(a)
Figure 11:
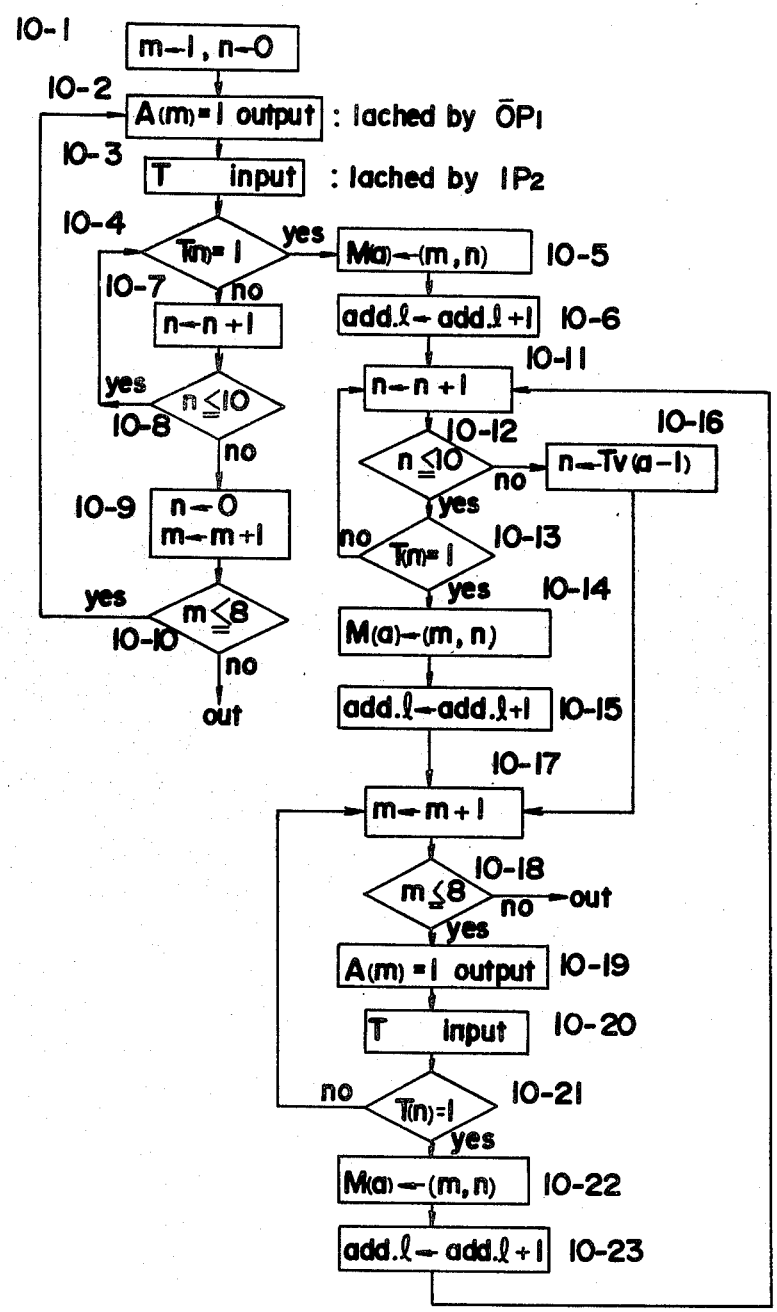
FIG. 11 is a flow chart for explaining a program line input routine in FIG. 9.

FIG. 9 illustrates a routine for setting the program lines, this routine includes subroutines (8-9) and (8-20) for displaying the program lines as shown in FIG. 10(a) (including FIG. 10(b)) and a subroutine (8-18) for inputting the program lines as shown in FIG. 11. This routine works like the program line setter, the program line memory device and the program line display. When the changeover switch is placed into a "SET" position, the switch (S12) is closed so that the CPU is reset and the setting routine is commenced. At the same time the built-in timer starts a time count. The steps (8-2) and (8-3) check if (S12) has been closed and, if the answer is negative, the camera will proceed with the camera or photographing routine.

The steps (8-4) through (8-11) determine which of the select buttons (S5)–(S10) has been depressed and the result of such determination selects a desired access region of the RAM through the step (8-7), firing the program select and program line displaying LEDs through the steps (8-8) and (8-9). This determination is carried out as follows. The (p) register containing the program select numbers is first loaded with "5" through the step (8-4) and the steps (8-5) and (8-6) decide if an input to the terminal (SI(5)) is at a "High" level. If not, the step (8-10) is executed to increment the contents of the (p) register by one, that is, p=6 with the results being introduced into the terminal (SI(6)). The terminals (SI(5))–(SI(10)) are interrogated once until the terminal (SI(p)) is at a "High" level. The camera will proceed with the step (8-12) unless all of these terminals are at a "High" level.

The steps (8-12) and (8-13) decide if the memory button (S11) has been actuated and, if so, the steps (8-14)–(8-16) clear the access region of RAM and the step (8-17) clears the program line being displayed. Clearing RAM is repeated until (add.l)=0, as decided by the step (8-16), while the contents (M(a)) of RAM at an address (a) are reduced to "0" in the step (8-14) and the lower 5 bits (add.l) of the address counter are repeatedly incremented by one through the step (8-15). As long as the memory button is not actuated, the camera does not advance toward the step (8-14) and any further succeeding steps so that it repeats a chain of the steps following the step (8-4) and the capability of modifying the program selection is available any desired number of times.

The succeeding steps (8-18)–(8-22) are effected for the purpose of inputting and displaying the program lines. The step (8-19) decides if the program line has been properly inputted and, if so, the step (8-20) permits the program line to be displayed. If not, the step (8-21) fires the error display LED and the step (8-22) clears any wrong program point stored. The latter occurs when the user has inadvertently inserted only one of the program pins or failed to insert the program pin corresponding to the second lowest Ev value. Under these circumstances, (add.l) is incremented by only "1" and is thus "1" because the program point is stored at the initial address of the access region of RAM.

The steps (8-23) and (8-24) determine again whether (S12) has been closed and the step (8-4) and the following steps are repeated as long as (S12) is in closed position.

When setting all of the program lines is completed and the changeover switch is turned to "PHOTOGRAPH" position, (S12) is opened so that all of the display LEDs are disabled through the step (8-25) to end the setting routine.

Even though the changeover switch is not returned to a "PHOTOGRAPH" position, the step (8-25) disables all of the displaying LEDs and terminates the setting routine automatically upon the passage of a given period of time (t), for example 10 minutes, as counted by the built-in timer.

FIG. 10(a) illustrates the program line displaying routine which is equivalent to the function of the program line display of FIG. 1. Matter-of-factly, the program line display circuit of FIG. 8 is enabled in this case.

The steps (9-1)–(9-4) are initializing steps, wherein the step (9-1) clears all the shift registers and the step (9-2) places the address counter at the initial address of the access region of the RAM. The steps (9-3) and (9-4) are to display a "general-purpose program line" previously stored in a region of ROM defined by an address (u=0) in the case where no program line is stored within the access region of RAM. It is understood that the "general-purpose program line" should be designed to assure a minimum opportunity of satisfactory photographing.

The steps (9-5) through (9-9) are provided to display the minimum Ev value of the program line. The step (9-5) evaluates the minimum Ev value loaded at the initial address (a) of the RAM and unloads the same into the (e) register containing the shift register numbers.

The steps (9-6) through (9-8) count the number of pulses supplied to the shift register, with the results being loaded into the (c) register, and the pulses are output in the step (9-0). The results of such counting indicate that the total number of the pulses is (Tv(a)+1), because the register is set at Tv=0 with the first pulse, when the minimum Ev value is less than "8" during the step (9-6), and the outputs of the shift register are shifted to the position Tv=Tv(a) upon receipt of Tv(a) pulses. On the other hand, if the minimum Ev value is "9" or more during the step (9-6), then the register is set at the position Av=8 upon receipt of the first pulse and the outputs of the register are shifted to the position Av=Av(a) upon receipt of further (8−Av(a)) pulses. Consequently, the total of the pulses is (9−Av(a)).

The step (9-10) and subsequent steps display the remaining program lines. In the step (9-10), the Ev value is increased by one to the minimum Ev value +1. The step (9-11) increments the address by one, the steps (9-13) through (9-19) count the number of the pulses and the step (9-20) outputs the pulses.

Calculations of the number of the pulses is carried out as follows. The step (9-13) decides whether the Av values or the Ev values are equal at the address (a) and the preceding address (a−1). When the Av values are equal, they are employed through the steps (9-14) through (9-16). If the Tv values are equal, then the Tv values are used during the steps (9-17) through (9-19). While the Av values are in use, the step (9-14) is effected in a manner similar to the step (9-7) when th Ev value is less than "8" so that the number of the pulses is Tv(a)+1={e−Av(a)}=1, i.e., (e=1−Av(a−1)). When the Ev value is "9" or more, the number of the pulses is (9-8). On the other hand, while the Tv value is in use, the step (9-17) counts the same number of the pulses as during the step (9-7) as long as the Ev value is "8" or less. Likewise the above mentioned step (9-8), the number of the pulses is 9−Av(a)=9−{e−Tv(a)} or (Tv(a−1)−9−e) when the Ev value is "9" or more.

The steps (9-13) through (9-22) are repeated until the Ev value reaches the Ev value at the address (a) through increments thereof in the steps (9-21) and (9-22). In other words, in the case where the two adjacent Av or Tv values stored in RAM are spaced by more than "2", interpolation is effected on the spacing and the program line is displayed every integer of the Ev values.

Eventually, the subroutine is completed when the contents M(a) of RAM or (add.l) are "0" as monitored by the step (9-12).

The steps (9-23) through (9-27) of FIG. 10(b) set up the pulse output routine, wherein the step (9-23) brings the terminal (DATA) to a "High" level and the step (9-24) feeds the first pulse to the terminal (e) and sets the first bit of the shift register. The step (9-25) holds the terminal (DATA) at a "Low" level and prevents any further data from being introduced and permits the succeeding pulses to shift the outputs of the register. While the contents of the (c) register are decremented by one through the step (9-26), the steps (9-24) through (9-26) are repeated until c=0 in the step (9-27).

FIG. 11 illustrates the program line input routine which serves like the program line setter of FIG. 1. In fact, the program line setting board (MTX1) of FIG. 7 is scanned and the program points are sequentially loaded into RAM beginning with the smallest Ev value.

The steps (10-1) through (10-10) seek the first program point or the point where the minimum Ev value is available. The steps (10-11) through (10-15) sense the program points on the equivalent Av curve, while the steps (10-16) through (10-23) sense the program points on the equivalent Tv curve, the program points thus sensed being loaded into the RAM. In the event that the first program point is not found, any further steps from the step (10-10) are skipped to thereby discontinue this routine with no data being loaded into the RAM.

The step (10-1) initializes the (m) and (n) registers containing the A line numbers (m=1–8) and the T line numbers (n=0–10) in connection with (MTX1). Once the step (10-2) has brought the terminal (A(1)) at a "High" level, the output is latched so that T is inputted into the (T) register via the step (10-3). The steps (10-4), (10-7) and (10-8) interrogate the terminals (T(0)) through (T(10)) and, if the terminals are at a "High" level or if the first program point is sensed, then the step (10-5) places the contents of the (m) and (n) registers or the Av and Tv values into the RAM. (add.l) are incremented by one through the step (10-6). When no program point is present on the line Av=1, the step (10-9) works to increment the (m) register by one and resets the (n) register to "0". The step (10-2) and the succeeding steps are repeated again. In other words, Tv=0–10 on the line Av=A(m) are scanned in sequence in order to sense the program points.

The steps (10-11) through (10-13) are similar to the steps (10-4), (10-7) and (10-8) in that the terminal (T(n)) on the equivalent Av curve running through the first program point is examined and is stored into RAM through the step (10-14) when it is at a "High" level or when the program point is sensed. The step (10-15) increments (add.l) by one, followed by the step (10-17).

Provided that no program point is present on the equivalent Av curve, the step (10-16) places the Tv value "Tv(a−1)=Tv(0)" on the first program point into the (n) register and the steps (1-17) through (10-21) are effected to sense the program points on the equivalent Tv curve. More particularly, the steps (10-17) and (10-19) increment the contents of the (m) register one by one and hold the terminal (A(m)) at a "High" level. The steps (10-20) and (10-21) accept T, loads the same into the (T) register and check whether the terminal (T(n)) is at a "High" level. If it is at the "High" level, the step (10-22) loads the same into the RAM and the step (10-23) increments (add.l). What follows is the step (10-11).

It is noted that the steps (10-11) through (10-15) sense a program point on the equivalent Av curve which runs through the previous program point, while the steps (10-16) through (10-23) similarly sense a program point on the equivalent Tv curve running through the previous program point.

In this manner, the steps (10-11) through (10-15) and (10-16) through (10-23) are alternatively executed in order to sense the program points. Once all of the program points have been sensed, the succeeding steps succeeding the step (10-18) are blocked to thereby discontinue this routine. To read correctly the program lines through this routine, it is necessary to insert the program pin at the crossing of the Av and Tv values corresponding to the minimum and maximum Ev values and the shoulder of the program line when the program is loaded.

FIG. 12 illustrates the photographing routine, wherein the step (11-12) includes the program line display subroutine of FIG. 10(a) (inclusive of FIG. 10(b)). This routine is an equivalent to the functions of the program selector, the selecting member, the arithmetic unit and the memory circuit.

Upon first-step actuation of the release button, the switch (S1) is closed and CPU is reset so that the present routine is commenced and the built-in timer starts time counting. The steps (11-2) and (11-3) decide if the changeover switch is in a "PHOTOGRAPH" position and, if not, the program setting routine is restored. The steps (11-4) through (11-10) are similar to the steps (8-4) through (8-11) of FIG. 9 except the step (8-9) and these steps sense the program select buttons, fire the program select display LEDs and determines the access region of RAM. The purpose of the steps (11-11) and (11-12) is to fetch the "general-purpose program line" in the event that no program line is loaded in the access region of RAM. The step (11-13) displays the program lines and the step (11-14) introduces Avmin and Avmax into the (Avmin), (Avmax) registers.

The next succeeding step (11-15) introduces the photometric readout Evo and the step (11-16) evaluates the actual Ev value and the minimum Ev value of the program line stored and feeds both the values to the (Evo), (Ev) registers. While the upper 5 bits of the readout Evo are an integer portion and the lower 3 bits are a fraction portion, the Av and Tv values contained in RAM and the Avmin and Avmax of the camera are both integer, a multiplier "8" during the steps (11-16), (11-22), (11-25), (11-26), (11-27) and (11-29) is effective in punctuating the latter in agreement with the former.

The steps (11-17) through (11-23) decide whether the readout Evo value falls within a permissible range of the Ev values on the progrm lines. A low or high brightness warning is provided, indicating the need to effect measurements, whether the readout be below or above the lower or upper limit. Should the readout Evo be lower than the minimum Ev value as decided by the step (11-17), the step (11-18) provides immediately such a low brightness warning and locks the release and the camera returns to the step (11-15). If Evo≧Ev during the step (11-17), then the step (11-19) increments (add.l) one by one and the step (11-22) calculates the Ev value and loads the result of such calculation into the (Ev) register. The steps (11-19) through (11-22) are repeated until Evo<Ev in the step (11-23). In other words, the camera determines where the readout Evo falls within a range as defined by the respective program points on the program lines. If it is out of the range or if the final address of the program points is exceeded during the step (11-19) and the step (11-20) finds that the contents M(a) of RAM are equal to "0" or (add.l)="0", then the step (11-21) provides the high brightness warning and locks the release and the camera returns to the step (11-15).

In the case where the readout Evo is within the permissible range of the program lines, the step (11-15) evaluates the Tv value from the Av value, provided that the Av value is within a given range as determined by the step (11-24). If the step (11-24) answers "NO" or if the Tv value falls within a given range, then the step (11-26) evaluates the Av value from the Tv value and feeds the results of such evaluation to the (Av'), (Tv') registers.

The steps (11-27) through (11-30) determine whether the Av values thus evaluated fall within the permissible range of a lens and, if the answer indicates an Av value exceeding the lower limits, the step (11-28) provides the low brightness warning. On the other hand, with the Av value exceeding the upper limit, the step (11-30) provides the high brightness warning and locks the release to restore the step (11-15).

When the resultant Av value falls within the permissible range of the diaphragm, the step (11-31) permits such exposure signals as the stop and exposure time to be displayed in the viewfinder, depending upon the contents of the (Av') and (Tv') registers.

The steps (11-32) through (11-35) allow the step (11-36) to energize the release magnet (Mg1) and effect a releasing operation through the step (11-36) only when the switch (S2) closeable in response to second-step actuation of the release button and the switch (S3) closeable upon completion of windup of the film are both in a closed position. Measurements are repeated when either (S2) or (S3) is not in a closed position.

The step (11-37) accepts the readout Ev' during a stopping-down operation and feeds the same to the (Ev') register so that the (Ev') value decreases gradually. On stopping down to the calculated Av' value, there holds the relation Ev'≦Tv'. Then, the step (11-39) permits the diaphragm-actuating magnet (Mg2) to be energized to thereby interrupt the stopping-down operation and fix the stop value. At the same time the two exposure stopping magnet (Mg3) is also energized.

Thereafter, the reflective mirror moves up in a conventional mechanical fashion and an exposure of the film starts traveling upon completion of the movement of the mirror. As a result, the steps (11-40) and (11-41) sense (S4) in closed position and the step (11-42) executes logarithmic expansion on the Tv' value in a well known manner and counts time. Upon completion of time counting the step (11-43) permits two exposures to be traveled.

When travel of the two exposures is completed through the steps (11-44) and (11-45), (S3) is opened to finish the photographing routine. After (Mg1) and (Mg2) are turned OFF through the step (11-48), the step (11-15) is restored for the next photographing routine.

It is noted that the step (11-15) is, in fact, restored by way of the step (11-46). The step (11-46) determines whether the built-in timer senses the passage of the predetermined period of time, for example, 10 sec. and, if the answer is positive, the step (11-47) turns all the displaying LEDs OFF, ending the present routine.

Although the specific embodiments have been shown and suggested, it is obvious that the program line setting board may be installed on the rear lid or anywhere in the camera. In the latter case, if the board is provided independently of the camera body and removably connected to the CPU and other circuits in the camera body via the input/output ports by the use of a connector, the camera body can be simplified in structure with a decrease in weight, size and cost. In addition, the setting board may be used commonly to different cameras.

Furthermore, it is of course possible that the program line display may be provided on the setting board or any other position within the camera body, for example, in the viewfinder. The program line setter and the memory should not be limited to cameras of the type which uses the setting board and is in fact applicable to other types of cameras. For example, the conventional camera may be equipped with the program line memory device wherein the program lines are made up and stored sequentially through repeated actuations of the exposure time dial and the diaphragm ring for every exposure value and depression of the memory button. In this case, with cameras having a stop-preferred mode or an exposure time-preferred mode, a preferred stop or exposure time value is preset and the memory button is depressed so that the program lines may be stored at one time. In addition, should a plurality of sorts of the program lines be stored, any desired one of the program lines may be selected for photographing merely by actuating the program select buttons.

Whereas the above illustrated embodiments have been described in terms of the single-lens reflex camera with a focal plane shutter wherein the lens is exchangeable, the invention may be applied to a lens shutter camera to thereby provide "a middle class camera" wherein several sorts of programmed automatic exposure are available.

It is obvious from the foregoing that the present invention provides a camera whose exposure is controllable by a preset program line with the added feasibility of drawing up unique original program lines and modifying the program lines in accordance with the user's preference and intended use.

Since the program lines frequently used by the user may be stored previously, all that is necessary is to fetch this program line. This offers simplicity of manipulation as compared with the procedure of setting the program lines in the conventional stop-preferred or exposure time-preferred camera.

While the above embodiments have been disclosed as the best modes presently contemplated by the inventors, it should be realized that these examples should not be interpreted as limiting, because artisans skilled in this field, once given the present teachings, can vary from these specific embodiments.

Accordingly, the scope of the present invention should be determined solely from the following claims in which we claim:

1. A camera capable of programmed exposure control, in which a combination of the aperture size and the exposure time is automatically determined in a pre-programmed manner in response to the result of light measurement, comprising:
    means for measuring light to produce a light measuring signal;
    means for displaying a program to the user representing a relationship of a variety of possible values of the light measuring signal to various combinations of the aperture size and the exposure time, respectively;
    means associated with the camera for optionally setting up a desired program by the operator, said setting means being capable of visually composing the desired program on the displaying means;
    means for storing the set program; and
    means for controlling the aperture size and the exposure time in response to the light measuring signal actually produced by the measuring means by consulting the stored program.

2. The invention of claim 1, wherein the displaying means is located on the back lid of the camera.

3. The invention of claim 1, wherein said storing means is capable of storing a plurality of kinds of programs, and wherein the camera further comprises means for selecting one of the stored programs for exposure control.

4. The invention of claim 3, wherein the displaying means is capable of visually indicating the selected program, whereby the displaying means is utilized both for visual composition of the desired program upon setting and for visual indication of the selected program.

5. The invention of claim 4, wherein the displaying means is located on the back lid of the camera.

6. The invention of claim 1, wherein the displaying means is further capable of visually indicating the stored program, whereby the displaying means is utilized both for visual composition of the desired program upon setting and for visual indication of the stored program after the completion of the program.

7. The invention of claim 6, wherein the displaying means is located on the back lid of the camera.

8. The invention of claim 1, wherein said setting means includes means for manually composing the program.

9. In an automatic camera having the capability of varying both aperture sizes and exposure times in response to measurement of ambient light from an object scene, the improvement comprising:
    programming means for permitting an operator to subjectively and independently select a plurality of aperture sizes and related exposure times;
    means for displaying the programmed range of selected aperture sizes and exposure times; and
    means for storing the selected programmed range of aperture sizes and exposure times and implementing from said stored range one of the combination of aperture sizes and exposure times in response to the measurement of ambient light for taking a picture.

10. The invention of claim 9 further including means for selecting a previously stored programmed range of selected aperture sizes and exposure times.

11. The invention of claim 9 further including means for determining an erroneous entry into the programmed values and indicating such to the operator.

12. The invention of claim 9 further including a read only memory and a pre-stored program contained in the read only memory.

13. The invention of claim 9 wherein the displaying means includes a graphic representation of aperture sizes and exposure times.

14. The invention of claim 10 wherein the means for selecting a previously stored programmed range of selected aperture sizes and exposure times includes a program dial.

15. The invention of claim 10 wherein the means for selecting a previously stored programmed range of selected aperture sizes and exposure times includes program select buttons.

16. The invention of claim 9 wherein the automatic camera has a camera housing and the programming means includes program setting control members mounted on the exterior of the camera housing for varying the program by the camera operator.

17. A camera capable of programmed exposure control, in which a combination of the diaphragm aperture size and the exposure time is automatically determined in a pre-programmed manner in response to the result of light measurement, comprising:
   means for measuring light from an object to be photographed and producing a light measurement signal as a function of the measured light;
   means for displaying a program of exposure control which determines a combination of the diaphragm aperture size and the exposure time for each light measurement signal;
   a manual member which is manually operable;
   means for changing the program being displayed, in response to the manual operation of said manual member;
   means for storing the data of the displayed program; and
   means for controlling the diaphragm aperture size and the exposure time to values given for the light measurement signal in accordance with the stored program.

18. A camera capable of programmed exposure control, in which a combination of the diaphragm aperture size and the exposure time is automatically determined in a pre-programmed manner in response to the result of light measurement, comprising:
   a camera housing;
   means for measuring light from an object to be photographed and producing a light measurement signal as a function of the measured light;
   means for displaying a program of exposure control which determines a combination of the diaphragm aperture size and the exposure time for each light measurement signal;
   a manual member mounted on the exterior of the camera housing which is manually operable;
   means for changing the program being displayed, in response to the manual operation of said manual member;
   means for storing the data of the displayed program; and
   means for controlling the diaphragm aperture size and the exposure time to values given for the light measurement signal in accordance with the stored program.

* * * * *

UNITED STATES PATENT OFFICE
CERTIFICATE OF CORRECTION

Patent No. 4,455,068                Dated  June 19, 1984

Inventor(s)  Koichi Izuhara

It is certified that error appears in the above-identified patent and that said Letters Patent are hereby corrected as shown below:

Column 1, line 63, delete "optically."

Column 2, line 11, delete "user3s" and insert --user's--;
          line 17, delete "user3s" and insert --user's--.

Column 4, line 27, delete "positions" and insert --position--.

Column 7, line 13, delete "valued" and insert --values--.

Column 9, line 50, delete "thestep" and insert --the step--;
          line 51, delete "theminimum" and insert --the minimum--;
          line 63, delete "th" and insert --the--;
          line 65, after "i.e.," delete "(e = 1" and insert --(e + 1--.

Column 12, line 4 delete ">" and insert --$\geq$--.

Signed and Sealed this

Seventeenth Day of February, 1987

Attest:

DONALD J. QUIGG

*Attesting Officer*        Commissioner of Patents and Trademarks